(12) United States Patent
Liu et al.

(10) Patent No.: US 10,562,273 B2
(45) Date of Patent: Feb. 18, 2020

(54) COVER GLASS LAMINATION STRUCTURE AND MANUFACTURING METHOD THEREOF

(71) Applicant: NANCHANG O-FILM OPTICAL TECHNOLOGY CO., LTD, Nanchang (CN)

(72) Inventors: Wei Liu, Nanchang (CN); Genchu Tang, Nanchang (CN); Bin Tang, Nanchang (CN)

(73) Assignee: NANCHANG O-FILM OPTICAL TECHNOLOGY CO., LTD, Nanchang (CN)

( * ) Notice: Subject to any disclaimer, the term of this patent is extended or adjusted under 35 U.S.C. 154(b) by 329 days.

(21) Appl. No.: 15/600,394

(22) Filed: May 19, 2017

(65) Prior Publication Data
US 2018/0117880 A1 May 3, 2018

(30) Foreign Application Priority Data
Oct. 31, 2016 (CN) .......................... 2016 1 0939545

(51) Int. Cl.
*B32B 41/00* (2006.01)
*B32B 17/06* (2006.01)
(Continued)

(52) U.S. Cl.
CPC ................ *B32B 17/06* (2013.01); *B32B 7/12* (2013.01); *B32B 17/061* (2013.01); *B32B 37/12* (2013.01);
(Continued)

(58) Field of Classification Search
CPC ......... B32B 17/06; B32B 38/145; B32B 7/12; B32B 17/061; B32B 2315/08; B32B 2310/0831; B32B 2037/1253; B32B 2451/20; B32B 2307/40; B32B 2307/20; B32B 2457/208
(Continued)

(56) References Cited

U.S. PATENT DOCUMENTS 10,399,305 B2   9/2019   Liu et al.
2016/0016845 A1*  1/2016   Cho ........................ C03C 15/00
                                                        428/157
(Continued)

OTHER PUBLICATIONS

US Notice of Allowance, dated May 16, 2019, issued on U.S. Appl. No. 15/600,601 in the name of Nanchang O-film Optical Technology Co Ltd.
(Continued)

*Primary Examiner* — Michael N Orlando
*Assistant Examiner* — Joshel Rivera
(74) *Attorney, Agent, or Firm* — Franklin & Associates International Inc; Matthew F. Lambrinos

(57) ABSTRACT

A cover glass lamination structure includes: a glass substrate having opposed first and second surfaces; a frame ink layer disposed on the first surface, wherein the glass substrate is divided into a visible region and a peripheral region by an inner edge of the frame ink layer; an ultraviolet (UV) textured layer disposed on the frame ink layer, wherein an inner edge of the UV textured layer falls within between the inner edge and an outer edge of the frame ink layer; and a coating layer disposed on the UV textured layer.

20 Claims, 4 Drawing Sheets

(51) Int. Cl.
  *B32B 37/12*    (2006.01)
  *B32B 7/12*     (2006.01)
  *B32B 38/00*    (2006.01)
(52) U.S. Cl.
  CPC .... *B32B 38/145* (2013.01); *B32B 2037/1253* (2013.01); *B32B 2307/20* (2013.01); *B32B 2307/40* (2013.01); *B32B 2310/0831* (2013.01); *B32B 2315/08* (2013.01); *B32B 2457/20* (2013.01); *B32B 2457/208* (2013.01)
(58) Field of Classification Search
  USPC .......................... 156/64, 350, 351, 378, 379
  See application file for complete search history.

(56) References Cited

U.S. PATENT DOCUMENTS

| | | |
|---|---|---|
| 2017/0150626 A1* | 5/2017 | Kim .................. G02F 1/133308 |
| 2018/0117880 A1 | 5/2018 | Liu et al. |
| 2018/0117882 A1 | 5/2018 | Liu et al. |
| 2018/0118605 A1 | 5/2018 | Liu et al. |
| 2019/0041568 A1 | 2/2019 | Li et al. |

OTHER PUBLICATIONS

Requirement for Restriction/ Election, dated Apr. 24, 2019, issued on U.S. Appl. No. 15/600,528 in the name of Nanchang O-film Optical Technology Co Ltd.

\* cited by examiner

COVER GLASS LAMINATION STRUCTURE AND MANUFACTURING METHOD THEREOF

RELATED APPLICATIONS

This application claims priority under 35 U.S.C. § 119 to Chinese Patent Application No. 201610939545.8, filed on Oct. 31, 2016. The entire content of which is incorporated herein in its entirety.

FIELD OF THE INVENTION

The present disclosure relates to touch devices, and more particularly relates to a cover glass lamination structure which can be applied to a touch device and a method of manufacturing the same.

BACKGROUND OF THE INVENTION

Cover glass is widely used in electronic devices having a touch function. Usually, the cover glass is provided with a plurality of decorative layers, so as to meet specific appearance requirements of the cover glass. For example, the cover glass can be divided into a visible region and a peripheral region. Normally, an ultraviolet (UV) textured layer is formed on the cover glass, and other decorative layers are then disposed on the UV textured layer, such that they can be attached to the glass cover. During the manufacturing process of the UV textured layer, it is required to clean and remove the uncured UV adhesive. However, during cleaning, since it is difficult to maintain a uniform rinsing force of the flushing liquid, the edge of the UV textured layer is prone to become serrated, thus significantly affecting the appearance yield of the cover glass.

SUMMARY OF THE INVENTION

The present disclosure is directed to a cover glass lamination structure and a method of manufacturing the same.

A cover glass lamination structure includes: a glass substrate having opposed first and second surfaces; a frame ink layer disposed on the first surface, wherein the glass substrate is divided into a visible region and a peripheral region by an inner edge of the frame ink layer; an ultraviolet (UV) textured layer disposed on the frame ink layer, wherein an inner edge of the UV textured layer falls within between the inner edge and an outer edge of the frame ink layer; and a coating layer disposed on the UV textured layer.

A method of manufacturing a cover glass lamination structure includes:

providing a glass substrate having opposed first and second surfaces;

printing a frame ink layer on the first surface, wherein the glass substrate is divided into a visible region and a peripheral region by an inner edge of the frame ink layer;

coating an ultraviolet (UV) adhesive on the glass substrate and the frame ink layer, curing and rinsing the UV adhesive to form a UV textured layer on the frame ink layer, wherein an inner edge of the UV textured layer falls within between the inner edge and an outer edge of the frame ink layer; and plating a film on the first surface of the glass substrate, the frame ink layer, and the UV textured layer, and forming a coating layer after plating stripping the film.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION OF THE EMBODIMENTS

Reference will now be made to the drawings to describe, in detail, embodiments of the present cover glass lamination structure and manufacturing method thereof. It should be noted that references to "an" or "one" embodiment in this disclosure are not necessarily to the same embodiment, and such references mean at least one.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

Figure 1:
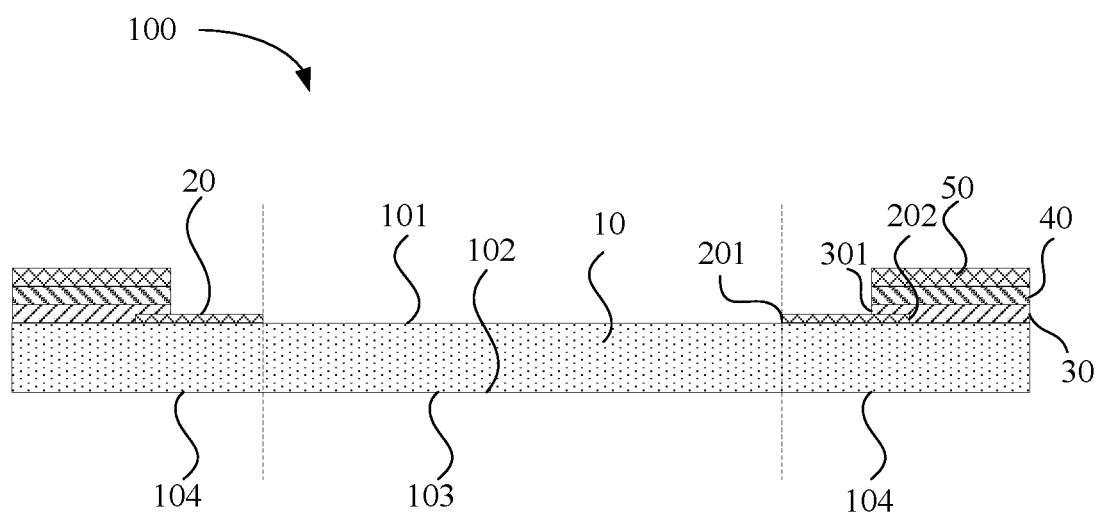
FIG. 1 is a cross-sectional view of a cover glass lamination structure according to one embodiment.

Referring to FIG. 1, a cover glass lamination structure 100 can serve as a displaying housing for electronic devices (not shown) with touch function, the electronic devices can include, but are not limited to, mobile phones, cameras, tablets, and terminal displays.

The cover glass lamination structure 100 includes a glass substrate 10, a frame ink layer 20, an ultraviolet (UV) textured layer 30, a coating layer 40, and a base cover ink layer 50.

The glass substrate 10 has a first surface 101 and a second surface 102, which are opposite to each other. In the illustrated embodiment, the glass substrate 10 is a flat glass. In alternative embodiments, the glass substrate 10 may have at least part of a curved surface. The glass substrate 10 can be shaped as a rectangle, a circle, a square or the like, depending on the electronic device to be applied.

In the illustrated embodiment, the first surface 101 of the glass substrate 10 faces an interior of the electronic device, while the second surface 102 faces the user. In one embodiment, in accordance with requirements for anti-reflection and anti-fingerprint of the electronic device, the second surface 102 can be provided with a functional layer (not shown), such as an anti-reflection layer, an anti-fingerprint layer or the like. In addition, the glass substrate 10 can be subjected to a reinforcing treatment, so as to from a hardened film layer on either surface of the glass substrate 10.

The frame ink layer 20 is disposed on the first surface 101. An inner edge 201 of the frame ink layer 20 divides the glass substrate 10 into a visible region 103 and a peripheral region 104, which is located at a peripheral of the visible region 103. The visible region 103 is a visually visible region, which is transparent in a visible direction from the second surface 102 towards the first surface 101. The peripheral region 104 is non-transparent and invisible by virtue of the frame ink layer 20 or the like, i.e., one cannot see the scene on the other side of the glass substrate 10 in a visible direction from the second surface 102 towards the first surface 101.

As illustrated in FIG. 1, an outer edge 202 of the frame ink layer 20 falls within an edge of the glass substrate 10. The width of the frame ink layer 20, i.e. a distance between an inner edge 201 and the outer edge 202, is depended on the size of a zigzag, which is formed on an inner edge 301 of the UV textured layer 30. Specifically, the minimum width of the frame ink layer 20 is greater than the maximum height of a zigzag at the edge of the UV textured layer 30, such that the zigzag formed on the edge of the UV textured layer 30 falls entirely within the range of the frame ink layer 20.

The UV textured layer 30 is disposed on the frame ink layer 20, and the inner edge 301 of the UV textured layer 30 falls within between the inner edge 201 and the outer edge 202 of the frame ink layer 20. In one embodiment, a portion of the UV textured layer 30 is in contact with the frame ink layer 20, while another portion of the UV textured layer 30 is in contact with the first surface 101.

By the configuration of the frame ink layer 20, when the UV textured layer 30 is observed from a second surface 102 side of the glass substrate 10, the inner edge 301 of the UV textured layer 30 is shielded by the frame ink layer 20, therefore, even if the zigzag is generated at the edge 301 during the formation of the UV textured layer 30, the appearance of the cover glass lamination structure 100 will not be affected, thereby reducing the defective rate and saving the cost.

By employing different templates, the UV textured layer 30 with different patterns can be presented, thereby the appearance of the cover glass lamination structure 100 will become more attractive and personalized.

Figure 2:
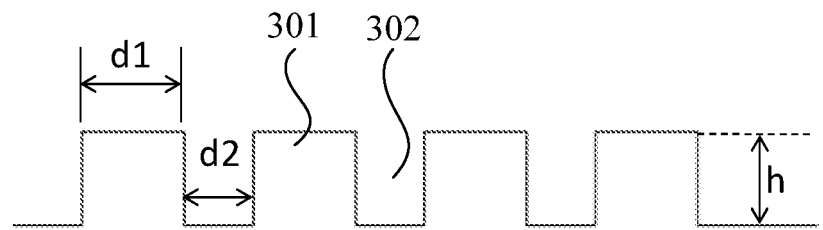
FIG. 2 is a schematic view of a UV textured layer according to one embodiment.

In one embodiment, referring to FIG. 2, the UV textured layer 30 is provided with a plurality of protrusions 301, and a recess 302 is formed between two adjacent protrusions 301. Therefore, the pattern of the UV textured layer 30 is presented by tracks formed by the protrusions 301 and the recesses 302. The pattern formed by extending the protrusions 301 and the recesses 302 is shaped as a concentric circular, wavy, crossed grid or wire drawing pattern.

The protrusion 301 has a height of about 5 μm to about 200 μm, and a width of about 20 μm to about 200 μm. It has been verified that, with the foregoing dimensions, in combination with the coating layer 40, the UV textured layer 30 can exhibit a wonderful visual effect and a significant attraction. Meanwhile, the protrusion 301 having the abovementioned height exhibits a greater advantage in the manufacturing process, for example, it is much easier to be attached and formed on the glass substrate 10. In one embodiment, the protrusion 301 has a height of about 10 μm to about 100 μm, and a width of about 50 μm to about 100 μm.

In one embodiment, as shown in FIG. 2, the protrusion 301 has a rectangular cross-section, and a distance d2 between two adjacent protrusions 301 (i.e. the width of the recess 302) is about 5 μm to about 100 μm. Furthermore, two adjacent protrusions 301 are spaced at about 10 μm to about 50 μm. Referring to FIG. 2, the height and width of the protrusion 301 are represented by h and d1, respectively. The height h is referred as a distance from a bottom of the recess 302 to a top of the protrusion 301.

Figure 3:
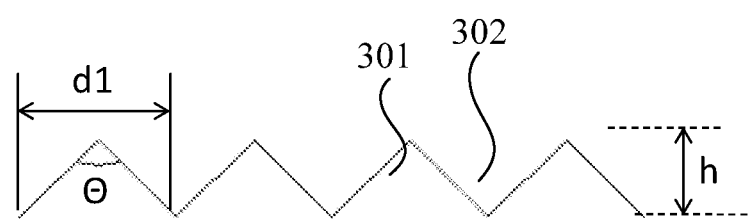
FIG. 3 is a schematic view of a UV textured layer according to another embodiment.
Figure 4:
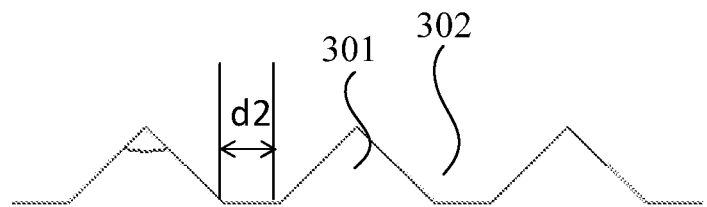
FIG. 4 is a schematic view of a UV textured layer according to another embodiment.

In one embodiment, as shown in FIG. 3, a cross-section of the protrusion 301 is shaped as a triangle. The height and width of the protrusion 301 are represented by h and d1, respectively. The height h is referred as a distance from a bottom of the recess 302 to a top of the protrusion 301. As shown in FIG. 3, bottoms of two adjacent protrusions 301 are abutted. In alternative embodiments, as shown in FIG. 4, bottoms of two adjacent protrusions 301 are spaced apart from each other, e.g., a distance d2 between two bottoms of the two adjacent protrusions 301 (i.e., the width of the bottom of the recess 302) is about 5 μm to about 100 μm. Additionally, a distance d2 between two bottoms of the two adjacent protrusions 301 can be about 10 μm to about 50 μm. An angle θ of an apex of the triangle is about 30° to about 150°. In one embodiment, the angle θ can be about 45° to about 120°.

Figure 5:
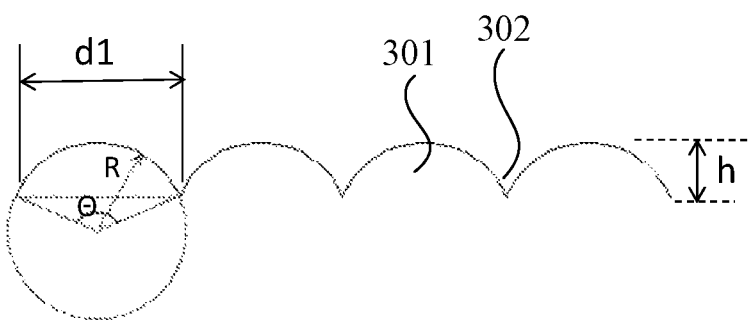
FIG. 5 is a schematic view of a UV textured layer according to another embodiment.

In one embodiment, as shown in FIG. 5, a cross-section of the protrusion 301 is shaped as an arc. The height and width of the protrusion 301 are represented by h and d1, respectively. The height h of the protrusion 301 is a height of the arc, the width d1 of the protrusion 301 is a length of the chord corresponding to the arc. In the illustrated embodiment shown in FIG. 5, the cross-section of the protrusion 301 is shaped as a minor arc, i.e., the height h of the protrusion 301 is less than a radius R of a circle corresponding to the arc.

Figure 6:
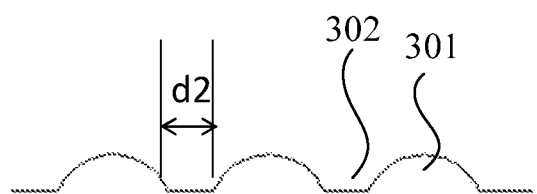
FIG. 6 is a schematic view of a UV textured layer according to another embodiment.

As shown in FIG. 5, bottoms of two adjacent protrusions 301 are abutted. In alternative embodiments, as shown in FIG. 6, bottoms of two adjacent protrusions 301 are spaced apart from each other, e.g., a distance d2 between two bottoms of the two adjacent protrusions 301 (i.e. the width of the bottom of the recess 302) is about 5 μm to about 100 μm. Additionally, a distance d2 between two bottoms of the two adjacent protrusions 301 can be about 10 μm to about 50 μm. A central angle θ of the arc is about 30° to about 150°. In one embodiment, the central angle θ is about 45° to about 120°.

The coating layer 40 is disposed on the UV textured layer 30. In the illustrated embodiment, the inner edge 301 of the UV textured layer 30 and an inner edge of the coating layer 40 are coplanar. The coating layer 40 may be, for example, a film exhibiting a metallic color. The coating layer 40 can be filled in the recess 302 or attached to the surface of the protrusion 301 of the UV textured layer 30. By the aid of the pattern of the UV textured layer 30, an appearance with different patterns and colors can be observed from a side of the second surface 102 of the glass substrate 10. The coating layer 40 may be one layer or more than one layers. The coating layer 40 is made of at least one selected from the group consisting of alumina oxide, niobium oxide layer, titanium oxide, vanadium oxide, tungsten oxide, silicon oxide, and silicon nitride.

The base cover ink layer 50 is disposed on the coating layer 40. Both of the base cover ink layer 50 and the coating layer 40 are not transparent, such that the portion of the glass substrate 10 shielded by the base cover ink layer 50 and the coating layer 40 will not be seen when observing from the second surface 102 side. The base cover ink layer 50 may be one layer or more than one layers.

In one embodiment, outer edges of the base cover ink layer 50 and the coating layer 40 are coplanar with the edge of the glass substrate 10. Additionally, an inner edge of the base cover ink layer 50 and an inner edge of the coating layer 40 are coplanar. In alternative embodiment, the base cover ink layer 50 can be omitted.

Figure 7:
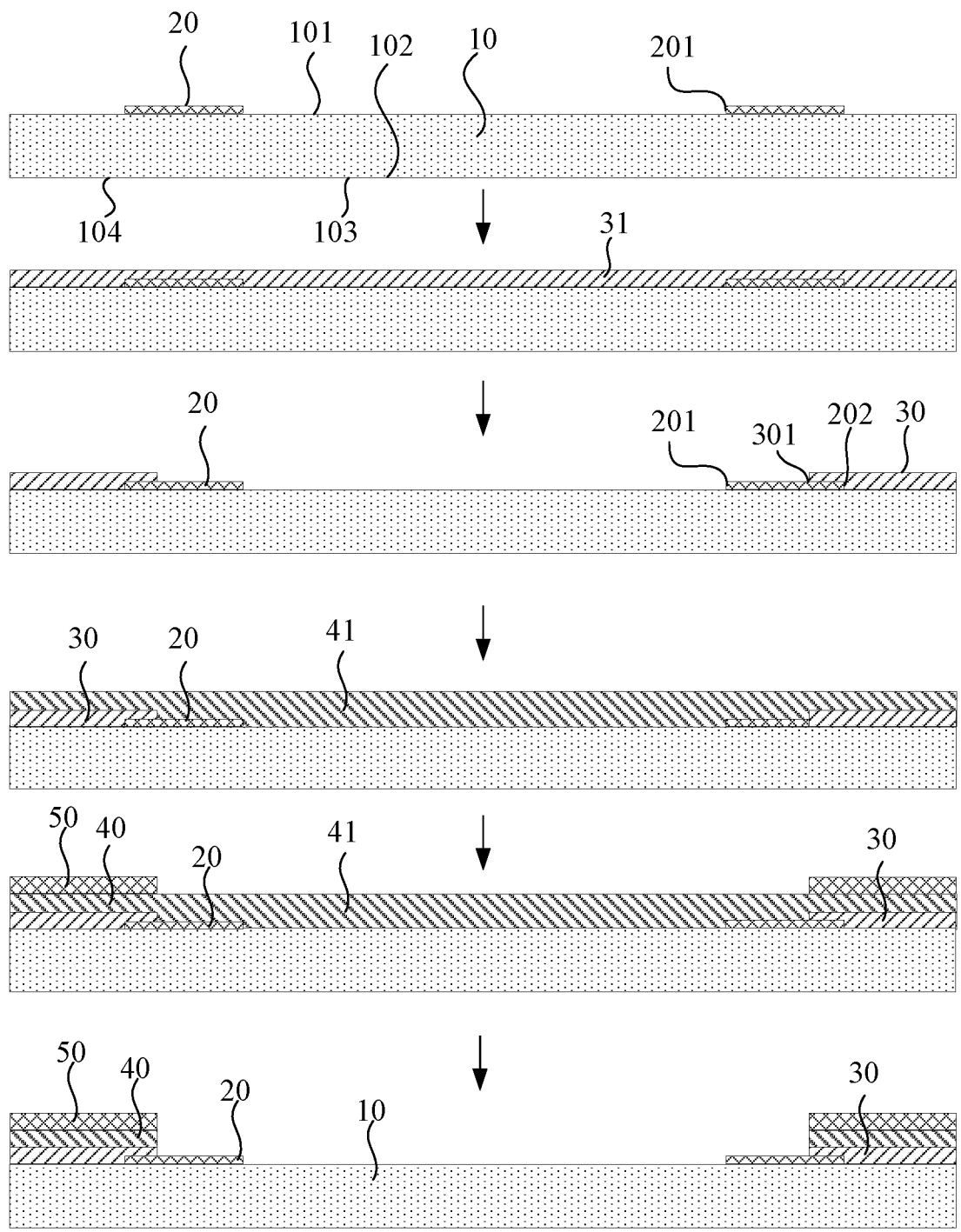
FIG. 7 illustrates diagrams representing various stages of a method of manufacturing the cover glass lamination structure according to one embodiment.

Referring to FIG. 7, a method of manufacturing the cover glass lamination structure 100 is also provided according to the present disclosure, which includes the following steps:

Firstly, a glass substrate 10 is provided having opposed first and second surfaces 101, 102. The glass substrate 10 may be subjected to a cleaning step or the like. A functional film (not shown), such as an antireflection film, an anti-fingerprint film or a hardened film, may be formed on the second surface 102 of the glass substrate 10.

Next, a frame ink layer 20 is printed on the first surface 101. The glass substrate 10 is divided into a visible region 103 and a peripheral region 104 by an inner edge 201 of the frame ink layer 20. The frame ink layer 20 serves to shield the zigzag generated at the edge 301 during the formation of the UV textured layer 30, thus the dimension of the frame ink layer 20 only needs to be able to cover the area where the inner edge of the UV texture layer 30 is located, and the rest region of the UV textured layer 30 need not to be shielded by the frame ink layer 20, such that a pattern presented by the UV textured layer 30, which is not shielded by the frame ink layer 20, can be observed on the second surface 102 side.

Next, a UV adhesive 31 is coated on the glass substrate 10 and the frame ink layer 20. The UV adhesive 31 is coated on the entire first surface 101. After a specific template is rolled on the UV adhesive 31, a corresponding pattern is then formed thereon. The UV adhesive 31 is then cured by applying a mask, and the uncured UV adhesive 31 is rinsed and removed, thus forming the UV textured layer 30. The inner edge 301 of the UV textured layer 30 falls within between the inner edge 201 and the outer edge 202 of the frame ink layer 20. Therefore, even if the zigzag is are generated at the inner edge 301 during the cleaning process, it will be shielded since the zigzag falls within the range of the frame ink layer 20, thus no appearance defect will be observed on the second surface 102 side.

After that, a film 41 is plated on the first surface 101, the frame ink layer 20, and the UV textured layer 30. The film 41 is formed on the entire range of the glass substrate 10.

A base cover ink layer 50 is then formed on the film 41. The base cover ink layer 50 can serve as a mask for forming a coating layer 40. The film 41 is then subjected to a plating stripping treatment by a plating stripping solution. A portion of the film 41 not covered by the base cover ink layer 50 will be dissolved in the plating stripping solution, thus the coating layer 40 is formed. It should be noted that, the coating layer 40 can be a plurality of layers. In alternative embodiment, the base cover ink layer 50 can be omitted.

Technical features of above embodiments can be combined arbitrary, for simple, any combination of every technical feature in above embodiments is not all illustrated. However, the technical features which are not contradicted to each other may fall into the scope of the specification.

Although the description is illustrated and described herein with reference to certain embodiments, the description is not intended to be limited to the details shown. Modifications may be made in the details within the scope and range equivalents of the claims.

What is claimed is:

1. A cover glass lamination structure, comprising:
  a glass substrate having opposed first and second surfaces;
  a frame ink layer disposed on the first surface, wherein the glass substrate is divided into a visible region and a peripheral region by an inner edge of the frame ink layer;
  an ultraviolet (UV) textured layer disposed on the frame ink layer, wherein an inner edge of the UV textured layer falls within between the inner edge and an outer edge of the frame ink layer such that the inner edge of the UV textured layer is shielded by the frame ink layer; and
  a coating layer disposed on the UV textured layer.

2. The cover glass lamination structure according to claim 1, wherein the outer edge of the frame ink layer falls within an edge of the glass substrate, a portion of the UV textured layer is in contact with the frame ink layer, another portion of the UV textured layer is in contact with the first surface.

3. The cover glass lamination structure according to claim 1, wherein an inner edge of the UV textured layer and an inner edge of the coating layer are coplanar.

4. The cover glass lamination structure according to claim 1, wherein the number of the coating layer is single or plural.

5. The cover glass lamination structure according to claim 1, wherein the coating layer is made of at least one selected from the group consisting of alumina oxide, niobium oxide layer, titanium oxide, vanadium oxide, tungsten oxide, silicon oxide, and silicon nitride.

6. The cover glass lamination structure according to claim 1, further comprising a base cover ink layer disposed on the coating layer.

7. The cover glass lamination structure according to claim 6, wherein an inner edge of the base cover ink layer and an inner edge of the coating layer are coplanar.

8. The cover glass lamination structure according to claim 1, wherein the second surface is provided with at least one of an anti-reflection film, an anti-fingerprint film, and a hardened film.

9. The cover glass lamination structure according to claim 1, wherein the UV textured layer comprises a plurality of protrusions, the protrusion has a height of about 5 µm to about 200 µm, and a width of about 20 µm to about 200 µm.

10. The cover glass lamination structure according to claim 9, wherein the protrusion has a height of about 10 µm to about 100 µm, and a width of about 50 µm to about 100 µm.

11. The cover glass lamination structure according to claim 9, wherein a cross-section of the protrusion is shaped as a triangle or an arc, bottoms of two adjacent protrusions are abutted, or bottoms of two adjacent protrusions are spaced at about 5 µm to about 100 µm.

12. The cover glass lamination structure according to claim 11, wherein bottoms of two adjacent protrusions are spaced at about 10 µm to about 50 µm.

13. The cover glass lamination structure according to claim 11, wherein an angle of an apex of the triangle is about 30° to about 150'; or a central angle of the arc is about 30° to about 150°.

14. The cover glass lamination structure according to claim 13, wherein an angle of an apex of the triangle is about 45° to about 120°; or a central angle of the arc is about 45° to about 120°.

15. The cover glass lamination structure according to claim 9, wherein a recess is formed between two adjacent protrusions, a pattern formed by extending the protrusion and the recess is shaped as a concentric circular, wavy, crossed grid or wire drawing pattern.

16. A method of manufacturing a cover glass lamination structure, comprising:

providing a glass substrate having opposed first and second surfaces;

printing a frame ink layer on the first surface, wherein the glass substrate is divided into a visible region and a peripheral region by an inner edge of the frame ink layer;

coating an ultraviolet (UV) adhesive on the glass substrate and the frame ink layer, curing and rinsing the UV adhesive to form a UV textured layer on the frame ink layer, wherein an inner edge of the UV textured layer falls within between the inner edge and an outer edge of the frame ink layer such that the inner edge of the UV textured layer is shielded by the frame ink layer; and plating a film on the first surface of the glass substrate, the frame ink layer, and the UV textured layer, and forming a coating layer after plating stripping the film.

17. The method according to claim 16, further comprising forming a base cover ink layer on the film.

18. The method according to claim 17, wherein the base cover ink layer is formed by printing, and subsequent to forming the base cover ink layer, the film is plating stripped using the base cover ink layer as a mask to form the coating layer.

19. The cover glass lamination structure according to claim 1, wherein a minimum width of the frame ink layer is greater than a maximum height of a zigzag at an edge of the UV textured layer.

20. The cover glass lamination structure according to claim 1, wherein the UV textured layer comprises a plurality of protrusions, a cross-section of the protrusion is shaped as a minor arc in such a way that a height of the protrusion is less than a radius of a circle corresponding to the arc.

\* \* \* \* \*